United States Patent
May et al.

[11] 3,747,275
[45] July 24, 1973

[54] DOOR SEAL SYSTEM

[75] Inventors: Gerald L. May, Akron; Scott Fulmer, Cincinnati, both of Ohio

[73] Assignee: The B. F. Goodrich Company, New York, N.Y.

[22] Filed: Jan. 19, 1972

[21] Appl. No.: 218,876

[52] U.S. Cl. .................................................. 49/477
[51] Int. Cl. ............................................. E06b 7/16
[58] Field of Search ...................... 49/477; 277/27; 220/46 P; 251/54

[56] References Cited
UNITED STATES PATENTS

| | | | |
|---|---|---|---|
| 3,100,918 | 8/1963 | Coverley | 49/477 |
| 3,438,150 | 4/1969 | Heim | 49/477 X |
| 2,908,948 | 10/1959 | Jones | 49/477 UX |
| 3,352,446 | 11/1967 | Anderson et al. | 220/46 P |
| 2,527,084 | 10/1950 | Smith | 49/477 X |
| 3,152,611 | 10/1964 | Hubby | 251/54 X |
| 3,406,682 | 10/1968 | Engstrom | 251/54 |
| 3,449,864 | 4/1969 | Prost-Dame et al. | 49/477 |
| 3,491,484 | 1/1970 | Heim | 49/477 X |

FOREIGN PATENTS OR APPLICATIONS

| | | | |
|---|---|---|---|
| 986,854 | 4/1951 | France | 49/477 |
| 547,072 | 8/1942 | Great Britain | 49/477 |
| 729,980 | 5/1955 | Great Britain | 49/477 |

*Primary Examiner*—Mervin Stein
*Assistant Examiner*—Philip C. Kannan
*Attorney*—John D. Haney et al.

[57] ABSTRACT

A self-contained door sealing system in which an expandable tubular seal is inflated from an air reservoir for compressing air during closing of the door and cushioning the closing. Flow of air under pressure from the air reservoir to the seal is controlled to inflate and expand the seal to provide sealing contact after the door is closed. Air under pressure is released from the seal as the door opening mechanism is actuated to deflate the seal before the door is opened.

10 Claims, 9 Drawing Figures

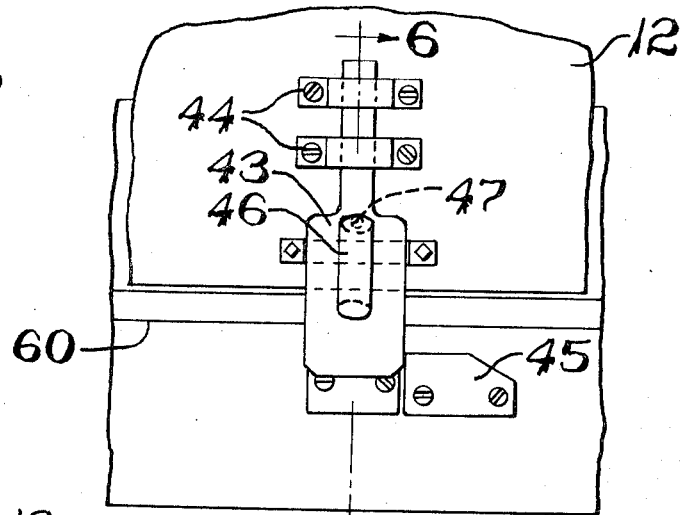
Fig. 5
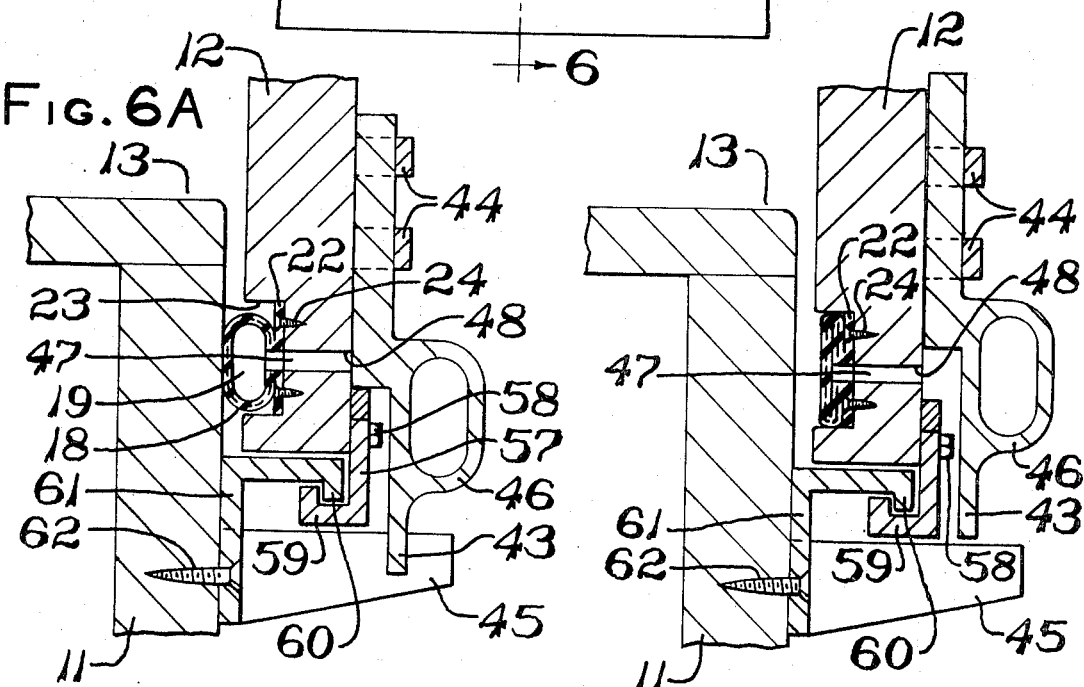
Fig. 6A
Fig. 6B
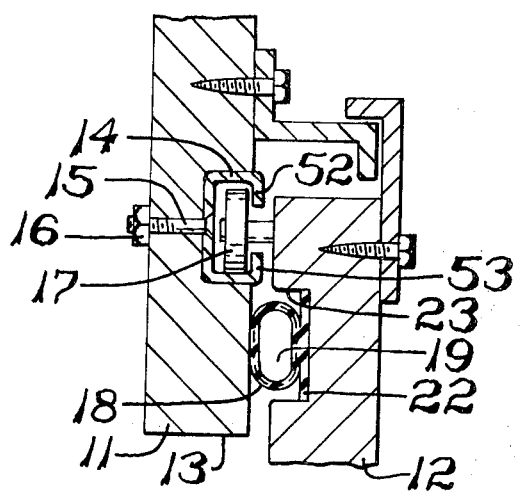
Fig. 7

DOOR SEAL SYSTEM

BACKGROUND OF THE INVENTION

This invention relates to an inflatable seal for doors or other closures where a tight seal is needed either to retain a material which may flow out of a container or protect the material inside the container against weather conditions, contaminating gases or dust or any other harmful elements which may enter through the closure. Seals of this type are needed to protect certain types of freight in a railroad freight car.

Heretofore inflatable seals for railroad freight car doors and other applications have not been possible because of the lack of a source of air pressure. The only source of this nature on a railroad freight car is found in the air braking system; however, this air pressure is not available for any other use. Accordingly, it has been necessary to use less effective noninflatable seals for freight car doors and similar applications.

SUMMARY OF THE INVENTION

With the door sealing system of this invention the closing of the door produces substantial air pressure in a bellows type reservoir which inflates a tubular seal between the door and the door opening. Controls are provided to inflate the seal after the door is closed and thereby prevent injury to the seal during closing. Likewise a pressure release valve is connected to the opening mechanism of the door to release the air pressure in the seal before the door is opened. The reservoir is contracted during the closing of the door compressing the air therein for inflating the tubular seal. After the door is opened the reservoir is expanded by springs and a one-way valve permits atmospheric air to enter the reservoir but prevents escape of air from the reservoir as it is being compressed during closing of the door. The air reservoir and tubular seal are located in protected locations during use; however, ready access to the apparatus may be had for ease of installation and maintenance. The complete system is self-contained and utilizes atmosphereic air under ambient conditions. Also, the only energy needed to operate the system is the energy contained in the moving door due to inertia and momentum. The reservoir not only provides the necessary air under pressure but also cushions the closing of the door.

The accompanying drawings show one preferred form of a door sealing system for a railroad freight car made in accordance with and embodying this invention and which is representative of how this invention may be practiced.

BRIEF DESCRIPTION OF THE DRAWINGS

In the drawings:

FIG. 5 is an enlarged fragmentary elevation of the door locking mechanism shown in FIG. 1 at the bottom of the door.

FIG. 6A is a fragmentary sectional view taken along the plane of line 6—6 of FIG. 5 showing the door seal and door locking mechanism in the closed locked position.

FIG. 6B is a fragmentary sectional view like FIG. 6A showing the door locking mechanism and seal in the position when the lock is opened and air is released from the seal prior to opening of the door.

FIG. 7 is an enlarged sectional view of the door seal in the closed position at the top edge of the door taken along the plane of line 7—7 of FIG. 1.

DETAILED DESCRIPTION

Figure 1:
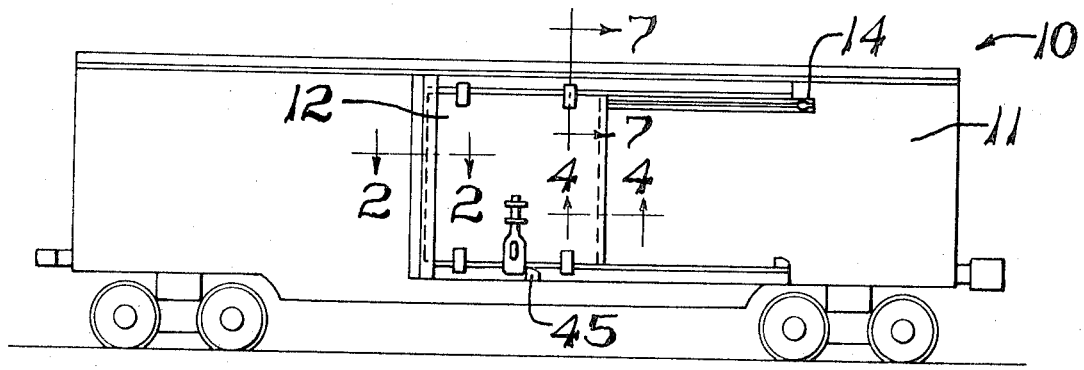
FIG. 1 is a front elevation of a freight car with the door in the closed sealed condition.

Referring to FIG. 1, a railroad freight car 10 is shown having a conventional box car structure. At each side the car wall 11 supports a closure member such as door 12 covering an opening 13 shown in FIGS. 2A, 2B, 4, 6A, 6B and 7.

Rails 14 are mounted on the wall 11 above the door opening 13 by bolts 15 and nuts 16 for receiving and supporting rollers 17 mounted on a upper edge of the door 12. The door 12 is movable from the closed position shown in FIG. 1 to an open position to the right as shown in FIG. 1 providing access to the opening 13 for loading and unloading the car 10.

As shown in FIGS. 2A, 2B, 4, 6A, 6B and 7, an inflatable expandable sealing means such as tubular body 18 of resilient stretchable material such as rubber which may be reinforced by fabric or other suitable reinforcing material extends around the edges of the door 12 at the inner surface facing the wall 11 and engaging the wall 11 in the inflated condition. The tubular body 18 is preferably continuous with an inner chamber 19 extending completely around the door 12. The tubular body 18 has flanges 22 extending from a tubular portion for fastening the body in a recessed groove 23 in the edge of the door as by screws 24. Fabric reinforcement 25 which may be imbedded in the tubular body 18 has cords extending at a suitable angle to provide for expansion of the body for sealing and contraction of the body for storing in the groove 23 when deflated.

Figure 3:
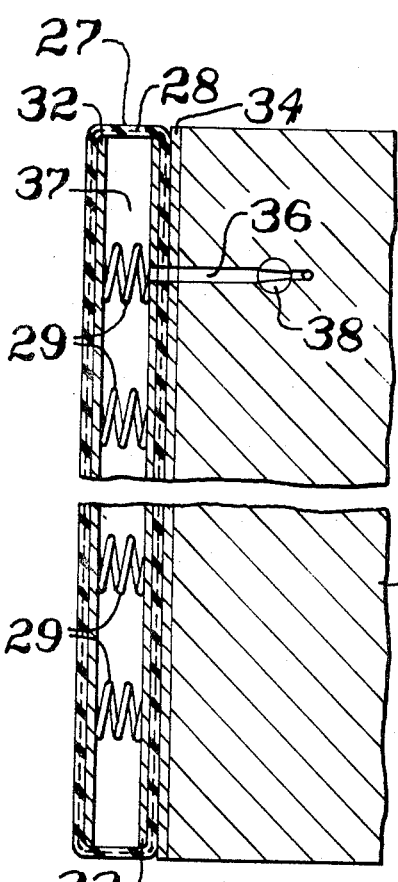
FIG. 3 is a fragmentary sectional view of the reservoir taken along the plane of line 3—3 in FIG. 2A.
Figure 2A:
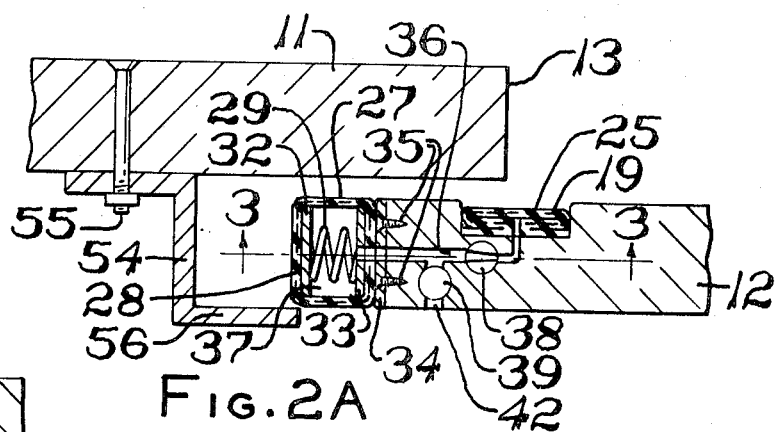
FIG. 2A is a fragmentary enlarged detailed sectional view showing the door just before closing taken along the plane of line 2—2 of FIG. 1.
Figure 2B:
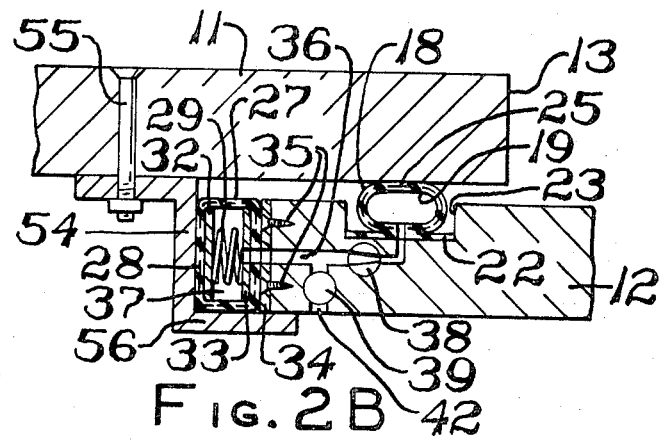
FIG. 2B is a fragmentary enlarged detailed sectional view like FIG. 2A showing the door in the closed position.
Figure 4:
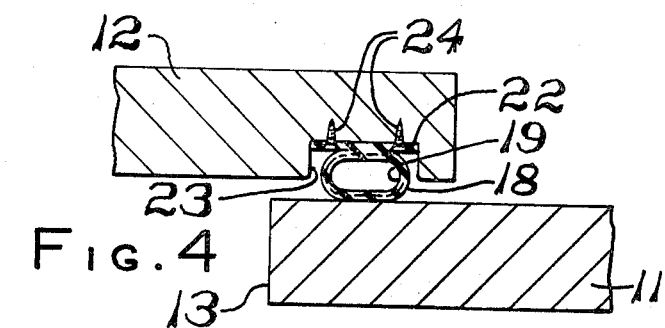
FIG. 4 is an enlarged fragmentary sectional view of the door seal in the closed position at the trailing edge of the door taken along the plane of line 4—4 of FIG. 1.

Referring to FIGS. 2A, 2B and 3, a compressible container or bellows 27 is mounted on the leading edge of the door for compressing air to expand the tubular body 18 and provide the seal between the door 12 and the wall 11. The bellows 27 has walls of flexible resilient rubber-like material which may be reinforced by fabric plys 28. The bellows 27 may be extended as shown in FIG. 2A and FIG. 3 by helical springs 29 sandwiched between metal plates 32 and 33 on opposing inside walls of the bellows. One of these plates 33 may be fastened to a mounting plate 34 which is in turn fastened to the leading edge of the door 12 by screws 35 or other fastening means.

As is shown in FIG. 2A and FIG. 2B an air line 36 connects the inner chamber 19 of the tubular body 18 with inner chamber 37 of the bellows 27. A control valve which may be a restricted orifice member 38 is interposed between the tubular body 18 and bellows 27 for restricting and controlling the flow of air from the bellows to the tubular body. A one way check valve 39 admitting the flow of air into the bellows 27 but preventing a flow of air out to the atmosphere is connected to the air line 36 between the restricted orifice member 38 and bellows 27. This check valve 39 is connected to the atmosphere through a second air line 42 opening on the outer wall of the door.

Referring to FIGS. 5, 6A and 6B, a door bolt 43 is shown mounted on the door 12 for sliding movement in brackets 44 from the downward locked position shown in FIGS. 5 and 6A with the bolt in engagement with door stop 45 to the upper unlocked position shown in FIG. 6B where the bolt is lifted to clear the door stop. A handle 46 on the door bolt 43 is used to lift the bolt and then move the door 12 in the desired direction. At the portion of the tubular body 18 adjacent the door bolt 43 an air passage 47 extends from the inner chamber 19 to the wall of the door where an opening 48 is closed by the door bolt in the closed position of the door 12 as shown in FIG. 6A. The opening 48 is opened to the atmosphere in the unlocked position of the door bolt 43 as shown in FIG. 6B, permitting escape of the air and deflation of the tubular body 18 when the door 12 is to be opened.

The door 12 is restrained from movement away from the wall 11 by the rail 14 at the top which has restraining flanges 52 and 53 for enclosing the rollers 17. At the leading edge of the door 12 an angle member 54 is mounted on the wall 11 by bolts 55 and has an edge 56 overlapping the leading edge of the door. At the bottom of the door 12 brackets 57 are mounted on the door by bolts 58 and have channel sections 59 for receiving a down turned edge 60 of angle number 61 mounted on the wall 11 of the freight car 10 by bolts 62.

In the operation of the closure sealing system described above, the bellows 27 is normally extended in the position shown in FIG. 2A and FIG. 3 by the springs 29 abutting the plates 32 and 33 providing space in the inner chamber 19 for air at atmospheric pressure which may enter through check valve 39. Upon closing of the door 12 the leading edge carries the bellows 27 into engagement with the angle member 54 mounted on the wall 11 of the freight car and the momentum and inertia of the door compresses the air in the chamber as shown in FIG. 2B. For example, a freight car door may weigh around 650 lbs. and be closed at a speed of 5.93 ft. per second which is about the speed at which a man walks. The inertia and momentum of the door will be sufficient to provide a pressure of 22.7 lbs. per square inch in a typical door seal tubular body.

In order to prevent inflation of the tubular body 18 while the door 12 is still moving the restricted orifice member 38 limits the flow of air through the air line 36 and inflation and expansion of the tubular body into sealing engagement with the wall 11 is therefore not completed until after the door has stopped moving.

At the time the door 12 is closed the door bolt 43 is in the down position as shown in FIG. 6A closing the opening 48 while the tubular body 18 is being expanded. Accordingly, the tubular body 18 will remain inflated and in engagement with the wall 11 of the freight car 10 as long as the door bolt 43 is in the down position and engages the door stop 45. This will maintain the seal around the door 12 retaining material in the freight car and preventing contaminating gases and other matter from entering the freight car through the door opening 13. When it is desired to open the door 12, the door bolt 43 is lifted by the handle 46 to the position shown in FIG. 6B where the air passage 47 and opening 48 are opened to the atmosphere and permit the air in the inner chamber 19 of tubular body 18 to exhaust through the air line and opening. This causes the tubular body 18 to deflate into the position shown in FIG. 6B spaced from the wall 11 so that upon movement of the door 12 there will be no damage to the tubular body.

As the door 12 is opened the springs 29 will expand the bellows 27 which will then be filled with air at atmospheric pressure and the closure sealing system will be ready for sealing when the door is again closed.

When the tubular body 18 is expanded into contact with the wall 11 the door 12 will be urged away from the wall and this outward movement will be prevented by the flanges 52 and 53 of rail 14, the angle member 54 and the brackets 57 and channel sections 59. Accordingly in addition to providing a seal around the opening 13 the tubular body 18 will hold the door 12 in a position reducing rattling and wear of the door and associated parts.

In the present embodiment the bellows 27 is mounted on the door. However it is understood that the bellows may also be mounted on the structure containing the opening and be connected to a sealing tubular body which is also mounted on the structure containing the opening for expansion into engagement with the door. It is also understood that the bellows may be incorporated into other structures adjacent the door which may be subject to sufficient force to compress the bellows. For example the bellows may consist of a compressible chamber in the floor adjacent the door or a compressible chamber in the truck bumper which is compressed when the truck is backed into a loading dock.

While certain representative embodiments and details have been shown for the purpose of illustrating the invention, it will be apparent to those skilled in the art that various changes and modifications may be made therein without departing from the spirit or the scope of the invention.

We claim:

1. A closure sealing system comprising a structure having an opening, a closure member movable over said opening to a closed position, inflatable expandable sealing means located between said structure and said closure member in the closed position, air pressure means connected to said sealing means for supplying air under pressure to inflate and expand said sealing means including pressure increasing means associated with said structure and responsive to the movement of said closure member over said opening, control means for directing air under pressure from said air pressure means to said sealing means after said closure member has been moved over said opening to said closed position to expand the sealing means and seal the space around said opening.

2. A closure sealing system according to claim 1 wherein said air pressure means comprises a compressible container and said pressure increasing means includes opposing walls movable toward each other to decrease the volume in said container and thereby increase the pressure in said air pressure means.

3. A closure sealing system according to claim 2 wherein said pressure increasing means contains a resilient element for returning said opposing walls to an expanded separated condition.

4. A closure sealing system according to claim 2 wherein said air pressure means contains a one-way valve permitting the entrance of air into said container during expansion while preventing escape of pressure air to the atmosphere.

5. A closure sealing system according to claim 1 wherein said air pressure means is connected to said sealing means by an air line and includes control means for delaying inflation of said sealing means until after said closure member is moved over said opening.

6. A closure sealing system according to claim 1 wherein said sealing means comprises a tubular body of resilient stretchable material extending around the opening when the closure member is over said opening.

7. A closure sealing system according to claim 6 wherein said tubular body is mounted on said closure member and a compressible container is mounted on said closure member for engagement with said structure to increase the pressure in said container upon engagement with said structure during movement of said closure member over said opening.

8. A closure sealing system according to claim 7 wherein said closure means is a sliding door and said compressible container is mounted on the leading edge of said door for engagement with said structure, said compressible container including separating plates within said container resiliently held apart by spring means in the open position of the door and moved together upon engagement of the leading edge with said structure compressing the air in said container during closing of said door and a connection between said container and said sealing means comprising an air line having a restriction to delay inflation and expansion of said tubular body until after said sliding door has been moved over said opening.

9. A closure sealing system according to claim 1 wherein said closure member includes valve means releasing the air pressure in said sealing means prior to the movement of said closure member away from said opening.

10. A closure sealing system according to claim 9 wherein said closure member includes bolt means holding said closure member over said opening and said valve means is connected to said bolt means for actuation prior to movement of said closure member away from said opening.

* * * * *